United States Patent [19]

Corrigan et al.

[11] Patent Number: 5,051,961

[45] Date of Patent: Sep. 24, 1991

[54] METHOD AND APPARATUS FOR SEISMIC SURVEY INCLUDING USING VERTICAL GRADIENT ESTIMATION TO SEPARATE DOWNGOING SEISMIC WAVEFIELD

[75] Inventors: Dennis Corrigan, Plano; Arthur B. Weglein, Grapevine; David D. Thompson, Plano, all of

[73] Assignee: Atlantic Richfield Company, Los Angeles, Calif.

[21] Appl. No.: 427,691

[22] Filed: Oct. 26, 1989

[51] Int. Cl.[5] .......................... G01V 1/36; G01V 1/38

[52] U.S. Cl. ........................................ 367/24; 367/57

[58] Field of Search ...................... 367/21, 24, 23, 57, 367/59; 364/421, 422

[56] References Cited

U.S. PATENT DOCUMENTS

| | | | |
|---|---|---|---|
| 4,254,480 | 3/1981 | French | 367/58 |
| 4,476,553 | 10/1984 | Ziolkowski | 367/144 |
| 4,648,080 | 3/1987 | Hargreaves | 367/20 |
| 4,692,907 | 9/1987 | Jubinski | 367/20 |
| 4,752,916 | 6/1988 | Lowenthal | 367/24 |
| 4,794,573 | 12/1988 | Bell et al. | 367/57 |

OTHER PUBLICATIONS

Sonneland, et al., "A New Method for Separating Wave Fields Into Up- and Downgoing Components", *Abstracts from the 47th Meeting of the European Association for Exploration Geophysicists,* Jun. 1985.

Sonneland, et al., "2D-Deghosting Using Vertical Receiver Arrays", *Abstracts from the 48th Meeting of the European Association of Exploration Geophysicists,* Jun. 1986.

Brink, et al., "Marine Seismic Exploration Using Vertical Receiver Arrays: Acquisition in Bad Weather", *Abstracts of the 49th Meeting of European Association of Exploration Geophysicists,* Jun. 1987.

Sonneland, et al., "2-D Deghosting Using Vertical Receiver Arrays", Presented to the Society of Exploration Geophysics, 1986.

Fricke, et al., "A Standard Quantitative Calibration Procedure for Marine Seismic Sources", *Geophysics,* vol. 50, 10/85, pp. 1525-1532.

Silvia et al., "Method for Obtaining a Nearfield Inverse Scattering to the Acoustic Wave Equation", *J. Acoust. Soc. of Am.* 69(2), (Feb. 1981), pp. 478-482.

Weglein, et al., "Scattering Theory Approach to the Identification of the Helmholtz Equation: A Nearfield Solution", *J. Acoust. Soc. of Am.* 69(2), (Feb. 1981), pp. 483-488.

Pao, et al., "Huygens Principle, Radiation Conditions, and Integral Formulas for the Scattering of Elastic Waves", *J. Acoust. Soc. of Am.,* vol. 59, No. 6, Jun. 1976, pp. 1361-1371.

Ziolkowski, et al., "The Signature of An Air Gun Array: Computation from Near-Field Measurements Including Interactions", *Geophysics,* vol. 47, 10/82, pp. 1413-1421.

Loewenthal, et al., "Deterministic Estimation of a Wavelet Using Impedance Type Technique", *Geophysical Prospecting,* vol. 33, 1985, pp. 956-969.

Hargreaves, "Far-Field Signatures by Wavefield Extra-Polation", Presented at the 46th Annual EAEG Meeting in London, Eng. in 6/84.

Loveridge, et al., "Effects of Marine Source Array Directivity on Seismic Data and Source Signature Deconvolution", *First Break,* Jul. 1984, pp. 16-22.

*Primary Examiner*—Ian J. Lobo
*Attorney, Agent, or Firm*—Vinson & Elkins

[57] ABSTRACT

A vertical gradient estimation technique is used to separate downgoing seismic ghost wavefields. The upgoing reflected seismic wavefield, allows the ghost wavefield to be attenuated to improve signal-to-noise ratio. The vertical gradient estimation technique is applicable to both marine seismic surveying using towed hydrophones, and to land seismic surveying using buried geophones. The technique allows the vertical signal gradient to be estimated from seismic signals measured at a single depth, and is based on a relationship between the measured seismic signals, and the source signature and the Green's function for the survey media. The technique involves determning (20) the source signature for the seismic source, and determining (21) the Green's function for the survey media. Seismic signals are then measured (22). These data are then processed to estimate (24) the vertical signal gradient as a function of source signature, Green's function and the measured seismic signals. Once the vertical signal gradient is estimated, it can be used in processing the measured seismic signals to separate and attenuate (26) the downgoing ghost component of the measured seismic signals.

33 Claims, 3 Drawing Sheets

METHOD AND APPARATUS FOR SEISMIC SURVEY INCLUDING USING VERTICAL GRADIENT ESTIMATION TO SEPARATE DOWNGOING SEISMIC WAVEFIELD

TECHNICAL FIELD OF THE INVENTION

This invention relates to seismic surveying in marine environments or land environments using buried receivers, and more particularly relates to an apparatus and method for seismic surveying including estimation of the vertical gradient for the measured seismic signals for use in separating useful upgoing reflected wavefields from extraneous downgoing ghost wavefields to improve the signal-to-noise ratio.

RELATED APPLICATIONS

The following related U.S. patent application is assigned to the assignee of this invention: Method for Seismic Exploration Including Elimination of Near Surface Effects, U.S. Pat. Ser. No. 07/339,341, pending.

BACKGROUND OF THE INVENTION

For marine seismic surveying, a streamer of hydrophone receivers is towed through the area of survey, and a series of seismic shots are set off to produce downgoing source seismic wavefields. These source seismic signals propagate through the water into the sub-bottom earth and reflect from rock strata, producing an upgoing acoustic pressure wavefield in the water that in turn reflects from the water surface to produce a downgoing acoustic ghost wavefield.

For each seismic shot, the hydrophones thus receive both (a) a useful upgoing acoustic pressure wavefield caused by reflections of the downgoing source seismic signals from rock strata, and (b) the extraneous downgoing surface reflection ghosts of the upgoing wavefield. The upgoing wavefield constitutes useful seismic (acoustic pressure) data that is recorded and processed to provide a seismic survey, while the downgoing ghost wavefield constitutes noise that degrades the signal-to-noise ratio.

This signal-to-noise problem caused by ghosting cannot be ameliorated merely by adjusting the depth of the hydrophone streamer. While the magnitude of the downgoing ghost wavefield can be reduced by reducing streamer depth, that approach is disadvantageous because it increases sea state noise.

The marine seismic survey geometry using underwater hydrophones has a land environment counterpart in a technique for land seismic surveying using buried geophone receivers, which is the subject of the referenced related application titled Multicomponent Seismology Using Buried Geophone Receivers. That related application describes seismic surveying using buried receivers to improve the signal-to-noise ratio and bandwidth for shear wave seismic data by decreasing the effect of extraneous surface waves that propagate in the near surface (low velocity) region. A disadvantage of that seismic survey technique is that, in addition to receiving the upgoing reflected seismic (elastic P and S) wavefields, the buried geophones also receive extraneous downgoing surface reflection ghosts. Again, this signal-to-noise problem caused by ghosting is not ameliorated merely by reducing buried receiver depth, since the receivers are normally desired to be buried to a depth below a substantial portion of the near surface region through which the surface waves propagate.

For both marine and buried-receiver land seismic surveying, the extraneous downgoing ghost wavefields decrease the geologic resolution available from processing the seismic data to create an accurate seismic survey. Since these downgoing ghosts cannot be easily avoided, the signal processing problem is to separate the up and downgoing seismic wavefields so that the downgoing ghost wavefield can be filtered or otherwise suppressed, thereby improving signal-to-noise ratio.

The ghosting problem is particularly significant for marine seismology, which is based on using sub-surface hydrophones. However, this problem also reduces the utility of buried-receiver land seismology and its attendant advantages in improving signal-to-noise ratio and bandwidth for the elastic shear wave component of the seismic data.

Accordingly, for both marine and buried-receiver land seismology, a need exists for a seismic signal processing technique for separating useful upgoing reflection wavefields from extraneous downgoing ghost wavefields, thereby improving the signal-to-noise ratio for the seismic data and improving geologic resolution for the seismic survey.

Various seismic signal processing techniques have been used to separate upgoing and downgoing seismic wavefields, both for marine and land-based buried receiver seismology. For example, for marine seismology, one prior technique involves towing two vertically displaced streamers to provide a vertical receiver array, and uses wavefield extrapolators for both the upgoing and downgoing waves to separate the downgoing wavefield. See "Marine Seismic Exploration Using Vertical Receiver Arrays: A Means for Reduction of Weather Downtime" by M. Brink, *Abstracts of the 49th Meeting of the European Association of Exploration Geophysicists*, June, 1987. See, also, "2D-Deghosting Using Vertical Receiver Arrays" by L. Sonneland, et al., *Abstracts from the 48th Meeting of the European Association of Exploration Geophysicists*, June, 1986; and "A New Method for Separating Wave Fields into Up- and Downgoing Components" by L. Sonneland, *Abstracts from the 47th Meeting of the European Association for Exploration Geophysicists*, June, 1985.

For buried-receiver land seismology, the requirement for separating up and downgoing wavefields is present in vertical seismic profiling (VSP) where a vertical array of geophones detects both up and downgoing wavefields which are separated by observing, on the basis of moveout, the negative slope of the downgoing wavefield and the positive slope of the upgoing wavefield.

These previously developed signal processing techniques for separating up and downgoing seismic wavefields all require a knowledge of the measured seismic signal (acoustic pressure or elastic displacement), and the vertical gradient of the seismic signal at the seismic receiver depth. For the marine environment, the acoustic pressure gradient in the vicinity of a hydrophone is the partial derivative of pressure with respect to distance, while for the land environment, the elastic displacement gradient is the partial derivative of displacement with respect to distance. These gradients can be determined using seismic signal measurements from receivers at different depths.

The practical disadvantage of these seismic signal processing techniques for separating the up and downgoing seismic wavefields is that, in normal marine and land seismic exploration, pressure is measured by subsurface hydrophones and displacement is measured by buried geophones, but the corresponding gradients are not available. Thus, these techniques are limited to acquisition geometries in which gradient information can be developed—for instance, marine seismology using a two streamer vertical array, or land seismology using multiple downhole receivers to provide a vertical array. Unfortunately, acquisition geometries requiring vertically displaced hydrophones/geophones often increase the expense and level of effort required for seismic surveying beyond that which is practical.

SUMMARY OF THE INVENTION

The present invention obtains improved seismic surveys, for both marine and land environments, by providing a signal processing technique that facilitates separating and attenuating the downgoing surface reflection ghosts that corrupt measurements of upgoing seismic wavefield data.

In one aspect, the invention is a seismic survey method (for both marine and buried-receiver land seismic surveying) using a vertical gradient estimation procedure to provide the gradient information necessary to separate the extraneous downgoing surface reflection ghost component of a seismic signal from the upgoing reflected wavefield component. The method involves determining the source signature for the seismic source used in generating seismic source signals. Green's function is then determined for the survey media. The seismic signals are measured using seismic signal receivers located at a selected depth z below the surface. The signal gradient is then estimated at the depth z (i.e., the pressure gradient for marine seismic signals and the displacement gradient for land seismic signals) using the relationship between (a) the signal gradient, and (b) the source signature and Green's function. Finally, the downgoing seismic signal component is separated from the upgoing seismic signal component using the estimated signal gradient. This method applies to either marine seismic surveying using a hydrophone streamer towed at a depth z, or to buried-receiver land seismic surveying using geophone receivers buried at a depth z.

For marine seismic surveys in which hydrophones measure acoustic pressure, the pressure gradient is calculated in accordance with the following relationship between the source signature, Green's function and the pressure gradient:

$$A(\omega)G(\underline{r}_s,\underline{r}_g,\omega) = \int_s [P(\underline{r}',\underline{r}_s,\omega)\nabla' G(\underline{r}',\underline{r}_g,\omega) - G(\underline{r}',\underline{r}_g,\omega)\nabla' P(\underline{r}',\underline{r}_s,\omega)] \cdot n' ds' \quad [1]$$

where $\underline{r}_s$, $\underline{r}_g$ and $\underline{r}'$ are vectors specifying, respectively, the seismic source, the point at which the pressure gradient is to be calculated and the point at which pressure measurements are made, and where:

(a) $A(\omega)$ is the frequency dependent seismic source signature (wavelet) emitted at $\underline{r}_s$;

(b) $G(\underline{r}', \underline{r}_s, \omega)$ is the Green's function (impulse response) of the medium containing the source;

(c) $P(\underline{r}', \underline{r}_s, \omega)$ is the actual acoustic wavefield measured at receiver position $\underline{r}'$ due to a source at $\underline{r}_s$;

(d) $\nabla' P(\underline{r}', \underline{r}_s, \omega)$ is the gradient of $P(\underline{r}',\underline{r}_s, \omega)$; and (e) $\underline{n} \cdot \nabla' P(\underline{r}',\underline{r}_s,\omega)$ is the component of the gradient perpendicular to S.

An important feature and advantage of the invention is that, for marine seismic surveying, a wider range of cable depths can be used for seismic data acquisition, allowing a streamer to be towed at a sufficient depth to minimize sea state noise without suffering significant degradation in geologic resolution caused by downgoing surface reflection ghosts. Likewise, for land seismic surveying, the invention makes the buried-receiver acquisition geometry more practical, thereby making more available the advantages it offers in terms of improved signal-to-noise ratio and bandwidth.

BRIEF DESCRIPTION OF THE DRAWINGS

For a more complete understanding of the present invention, and for further features, and advantages, reference is now made to the following Detailed Description, taken in conjunction with the accompanying Drawings, in which.

DESCRIPTION OF THE PREFERRED EMBODIMENT

The preferred embodiment of the seismic surveying method using a procedure for vertical gradient estimation is described in connection with marine seismic surveying. Based on this detailed description for the marine environment, the extension of this method, and the vertical gradient estimation procedure used in this method, to land seismic surveying is a matter of applying routine skill in the art.

Figure 1:
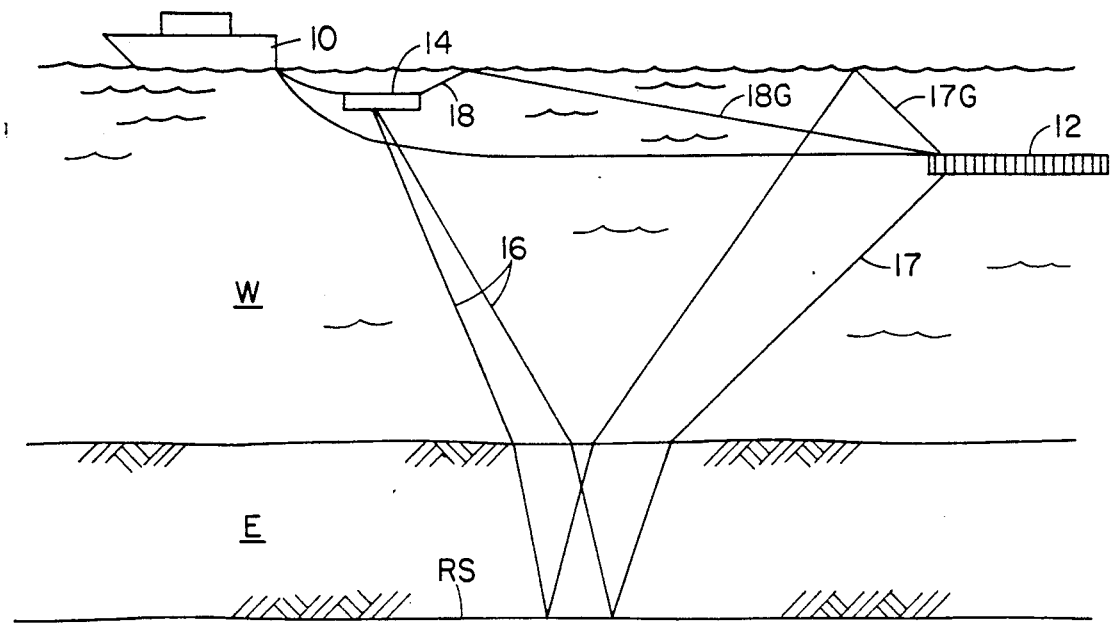
FIG. 1 shows a marine seismic survey acquisition geometry in which a seismic survey ship tows a hydrophone streamer through an area of survey.

As shown in FIG. 1, for marine seismic surveying, the survey is accomplished using a conventional acquisition geometry in which a towship 10 tows a single streamer 12 of hydrophones through a survey area at a selected depth z. The tow ship produces a series of seismic shots from a seismic source 14 at selected shot points through the survey area.

Each seismic shot produces downgoing seismic signals 16 that propagate through the water W, penetrating the earth E and reflecting off sub-bottom rock strata R5. These reflected seismic signals reach hydrophone streamer 12 in three paths, an upgoing reflection wavefield 17, and a downgoing surface reflection ghost 17G produced by an upgoing reflection wavefield that reaches the water surface and reflects downward. In addition, each seismic shot produces a direct upgoing wavefield 18 that reflects from the surface and reaches streamer 12 as a downgoing ghost 18G. The seismic signal measured by the hydrophones 12 includes an upgoing reflected wavefield component 17, as well as downgoing surface reflection ghost components 17G and 18G that constitute noise which degrades the signal-to-noise ratio.

The depth z of the hydrophone streamer is not critical to the present invention, being a matter of design selection. Because the vertical gradient estimation procedure provides a seismic signal processing technique that enables the downgoing ghost wavefield components detected by the hydrophone receivers to be separated and suppressed, the hydrophone streamer may be towed deep enough to minimize sea state noise.

Figure 2:
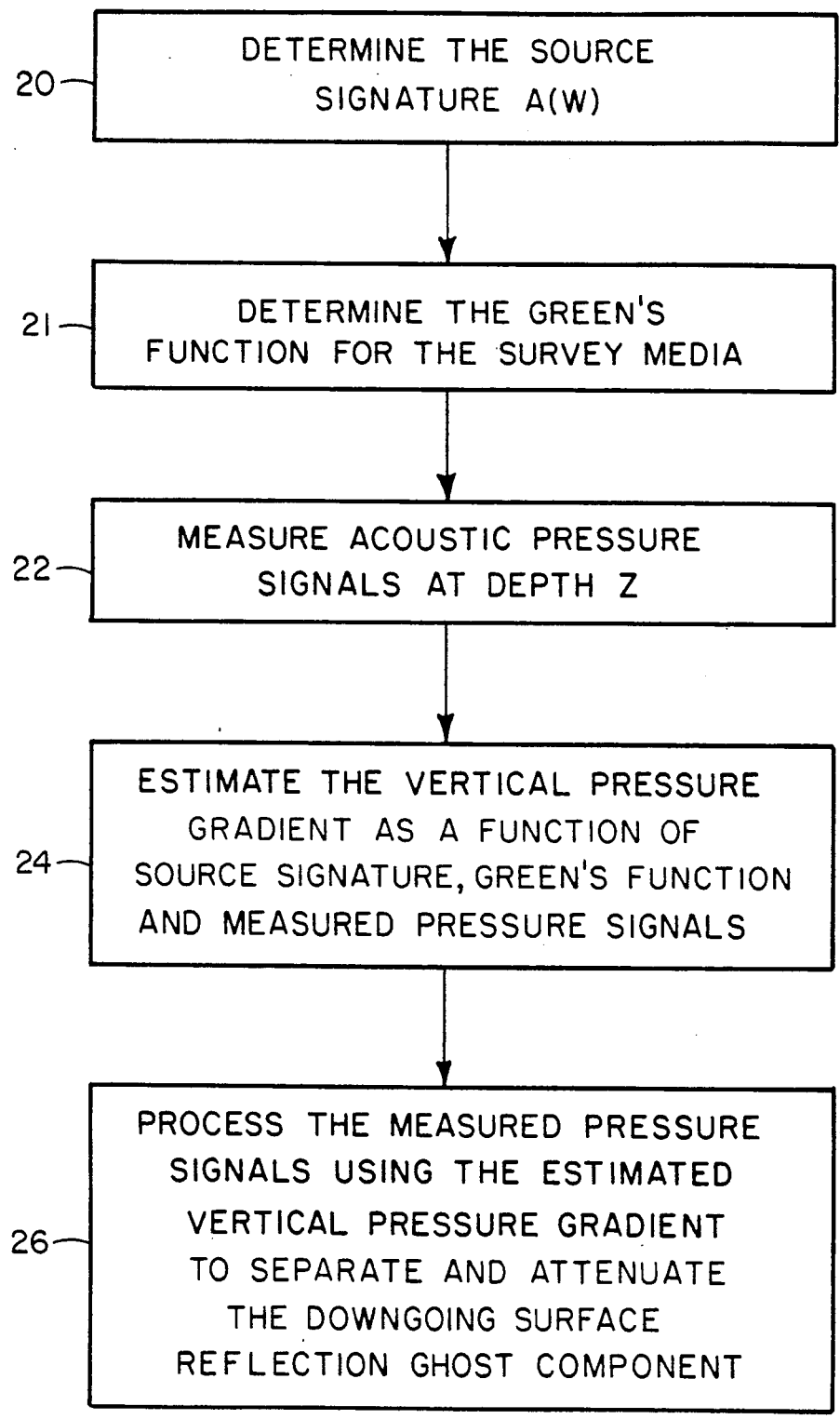
FIG. 2 is a flow diagram of the method of seismic survey using vertical gradient estimation to separate downgoing surface reflection ghosts.

As diagrammed in FIG. 2, the seismic surveying method using vertical gradient estimation for processing seismic signals that include both an upgoing reflected wavefield component and an extraneous downgoing ghost wavefield component, comprises the following basic steps:

(a) determining (20) the source signature for the seismic source used in generating the seismic source signals;

(b) determining (21) the Green's function (impulse response) for the survey media (water);

(c) measuring (22) acoustic pressure signals using a hydrophone streamer towed at a depth z below the water surface;

(d) estimating (24) the vertical pressure gradient at the depth z using the source signature, Green's function and the measured acoustic pressure signals; and (e) processing (26) the acoustic pressure signals using the estimated vertical pressure gradient to substantially separate and attenuate the extraneous downgoing ghost wavefield components, thereby enhancing the upgoing reflected wavefield component of the seismic signal.

The seismic source signature wavelet $A(\omega)$ is determined in a conventional manner. For example, the hydrophone streamer can be towed into water deep enough for the hydrophone to be in the far field, so that reflections from the water bottom and structure do not corrupt the measured source signature. See "A Standard Quantitative Calibration Procedure for Marine Seismic Sources", J. R. Fricke, J. M. Daw and D. H. Reed, Geophysics Vol. 50 p. 1525 (1985).

The Green's function (impulse response) for the survey media through which the seismic signals propagate is also determined in a conventional manner. For example, see *Methods of Theoretical Physics* A. M. Morse and H. Feshbach, McGraw Hill, NY (1953).

Figure 3A:
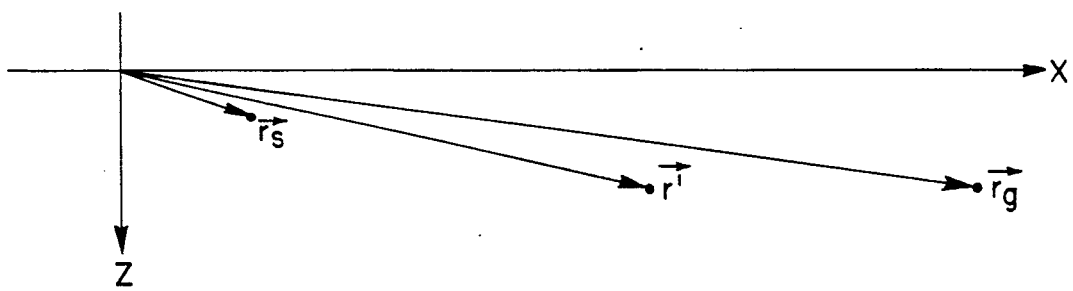
FIGS. 3A and 3B are coordinate systems used in describing the vertical gradient estimation procedure.

With reference to the coordinate system in FIG. 3A, the procedure for estimating the vertical pressure gradient at the streamer depth z is based on the following relationship between the source signature, the Green's function and the pressure gradient:

$$A(\omega)G(\underline{r}_s,\underline{r}_g,\omega) = \int_S [P(\underline{r}', \underline{r}_s,\omega)\nabla' G(\underline{r}', \underline{r}_g,\omega) - G(\underline{r}', \underline{r}_g,\omega)\nabla' P(\underline{r}', \underline{r}_s,\omega)] \cdot \underline{n}' ds' \qquad [1]$$

where $r_s$ is the coordinate of the seismic source; $r_g$ is the coordinate of the hydrophone receiver, the point at which the pressure gradient is calculated; and $r'$ is the coordinate of an arbitrary point on a surface of integration S at which acoustic wavefield measurements are made (for a practical application, the measurement point $r'$ is the same as to the hydrophone point $r_g$ at which the pressure gradient is to be calculated); and where (a) $A(\omega)$ is the frequency dependent seismic source signature (wavelet) emitted at $\underline{r}_s$;

(b) $G(\underline{r}', \underline{r}_s,\omega)$ is the Green's function (or impulse response) of the medium containing the source;

(c) $P(\underline{r}', \underline{r}_s,\omega)$ is the actual acoustic wavefield measured at receiver position $r'$ due to a source at $r_s$.

(d) $\nabla' P(\underline{r}',\underline{r}_s,\omega)$ is the gradient of $P(\underline{r}',\underline{r}_s,\omega)$; and (e) $\underline{n} \cdot \nabla' \underline{P}(\underline{r}',\underline{r}_s,\omega)$ is the component of the gradient perpendicular to S.

The integration is carried out over a surface that encloses the test point $\underline{r}'$. With the appropriate choice of the Green's function, the hemispherical portion of the integration surface may be made arbitrarily large and its contribution neglected. Then we can take the surface to be simply a plane perpendicular to the z axis.

This relationship is given in "Wavelet Estimation for a Multi-Dimensional Acoustic or Elastic Earth" by A. Weglein, et al., 1989 (attached as Appendix A and incorporated by reference). That reference describes a technique for estimating the source signature (wavelet) for marine (acoustic) or land (elastic) seismic surveying. For a marine environment, the technique uses measurements of both acoustic pressure and the pressure gradient, and knowledge of the Green's function for the survey media, to derive an estimate of the source signature (wavelet).

For the present invention, the source signature $A(\omega)$ for the seismic source is known, as is the Green's function $G(\underline{r}',\underline{r}_s,\omega)$ for the media under survey. while the pressure gradient $\nabla' P(\underline{r}',\underline{r}_s,\omega)$ must be estimated from the acoustic wavefield measurements at the hydrophone receiver point $\underline{r}'/\underline{r}_g$.

Figure 3B:
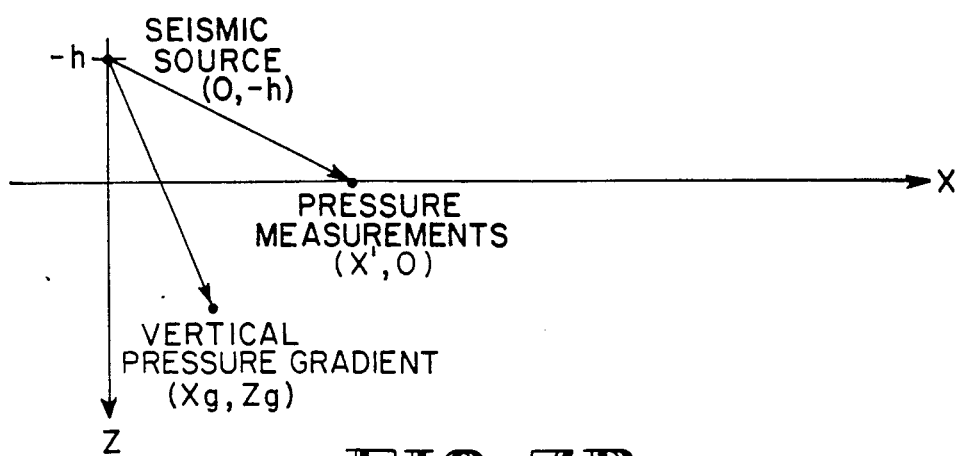

To illustrate the procedure, the problem is restricted to two dimensions, so that the surface integral reduces to a line integral. As diagrammed in FIG. 3B, an xz coordinate system is chosen so that the seismic source is $r_s(o, -h)$, the hydrophone receiver is located at a point $r_g(x_g, z_g)$ at which the vertical pressure gradient is to be calculated, and acoustic pressure measurements are taken along the line of integration $r'(x',o)$. In this case, the normal of the gradient $n \cdot \nabla'$ reduces to $\partial P/\partial z'$, and equation [1] becomes $$A(\omega)G(o,-h; x_g,z_g;\omega) = \int dx' \{P(x',o;o,-h,\omega) [\partial G(x',o;x_g,z_g;\omega)/\partial z'] - g(x',o;x_g,z_g;\omega) [\partial P(x',o;o,-h;\omega)/\partial z']\} \qquad [2]$$

Since the source signature $A(\omega)$ and the Green's function $G(x',o;o,-h;\omega)$ are known, the gradient $\partial P/\partial z'$ is obtained in the following manner. First equation [1] is rearranged $$\int dx' \; G(x; o;x_g,z_g;\omega)[\partial P(x',o;o,-h;\omega)/\partial z'] = -A(\omega) G(x_g,z_g;o,-h;\omega) + \int dx' \; P(x',o;o,-h;\omega) [\partial G(x',o;x_g,z_g;\omega)/\partial z'] \qquad [3]$$

The right hand side of equation [3] is known, and can be designated:

$$F(x_g,z_g;o,-h;\omega)$$

The Green's function is well known from the theory of wave propagation in acoustic media, and may be represented as an integral:

$$G(x',o;x_g,z_g;\omega) = (\tfrac{1}{2}\pi)\int dk' \; [e^{-ik'(x-x')} e^{ik'_z z'}]/2ik'_z \qquad [4]$$

where $$k'_z{}^2 = \omega^2/c^2 - k'^2$$

and c is the acoustic velocity.

This integral representation for the Green's function relates the Fourier Transform of the function $F(x_g,z_g;o,-h;\omega)$ with respect to x.

$$F(k;z;o,-h;\omega) \equiv \int dx \; e^{ikx} F(x_g,z_g;o,-h;\omega) \qquad [5]$$

to the desired quantity $\partial P/\partial z'$ by the relationship $$\partial P(x',o;o,-h;\omega)\partial z' = \int dk \; 2ik_z e^{-ikx - ik_z z} F(k;z;o,-h;\omega) \qquad [6]$$

where $$k_z{}^2 = \omega^2/c^2 - k^2$$

Accordingly, the acoustic pressure gradient $\partial P \partial z'$ may be estimated from the source signature $A(\omega)$ and hydrophone measurements of the acoustic wavefield $P(x',o;o,-h;\omega)$ using the following procedure:

Step 1: Determine the function $F(x_g,z_g;o,-h;\omega)$:

$$F(x_g,z_g;o,-h;\omega) = -A(\omega)\ G(x_g,z_g;o,-h;\omega)\ +\int dx'$$
$$P(x',o;o,-h;\omega)[\partial G(x',o;x_g,z_g;\omega)/\partial z']$$

Step 2: Perform the Fourier Transform of $F(x_g,z_g;o,-h;\omega)$ with respect to x to obtain:

$$F(k;z_g;o,-h;\omega)$$

Step 3: Multiply by the filter factor:

$$2ik_z e^{31\ ik_z z}$$

Step 4: Perform the inverse Fourier Transform with respect to k to obtain:

$$\partial P(x',o;o,-h;\omega)/\partial z'$$

Once the acoustic pressure gradient is estimated, both the acoustic pressure measured by a hydrophone receiver and its corresponding pressure gradient are known. The final step in the seismic surveying method using vertical gradient estimation is to separate the up and downgoing wavefields using one of the known techniques for wavefield separation, such as that disclosed in the references identified in the Background portion of this specification.

The disclosed seismic surveying method using vertical gradient estimation has been described in relation to processing seismic signals measured in a marine seismic survey, separating the upgoing reflected acoustic wavefield from the extraneous downgoing ghost wavefield to obtain a seismic survey record with an improved signal-to-noise ratio. The extension of this description to separating upgoing and downgoing elastic (P and S) wavefields in land seismic surveying is a matter of applying routine skill. That is, while the mathematical relationships for the source signature, the Green's function and the pressure gradient, and the corresponding relationship between them (i.e., the relationship corresponding to equations [1] and [2]) are somewhat more complex, their derivation from published reference materials in view of the disclosure for the marine environment in this specification is straightforward and requires no more than the application of routine skill.

In particular, the source signature for a land seismic source can be derived from measurements made with adjacent geophones for vibratory seismic sources or impactive seismic sources. If such measurements are used to obtain the source signature, corrections for the initial filtering effect of the near surface region are recommended. One technique for making such corrections is described in the referenced related application titled Method For Seismic Exploration Including Elimination of Near Surface Effects.

Figure 4:
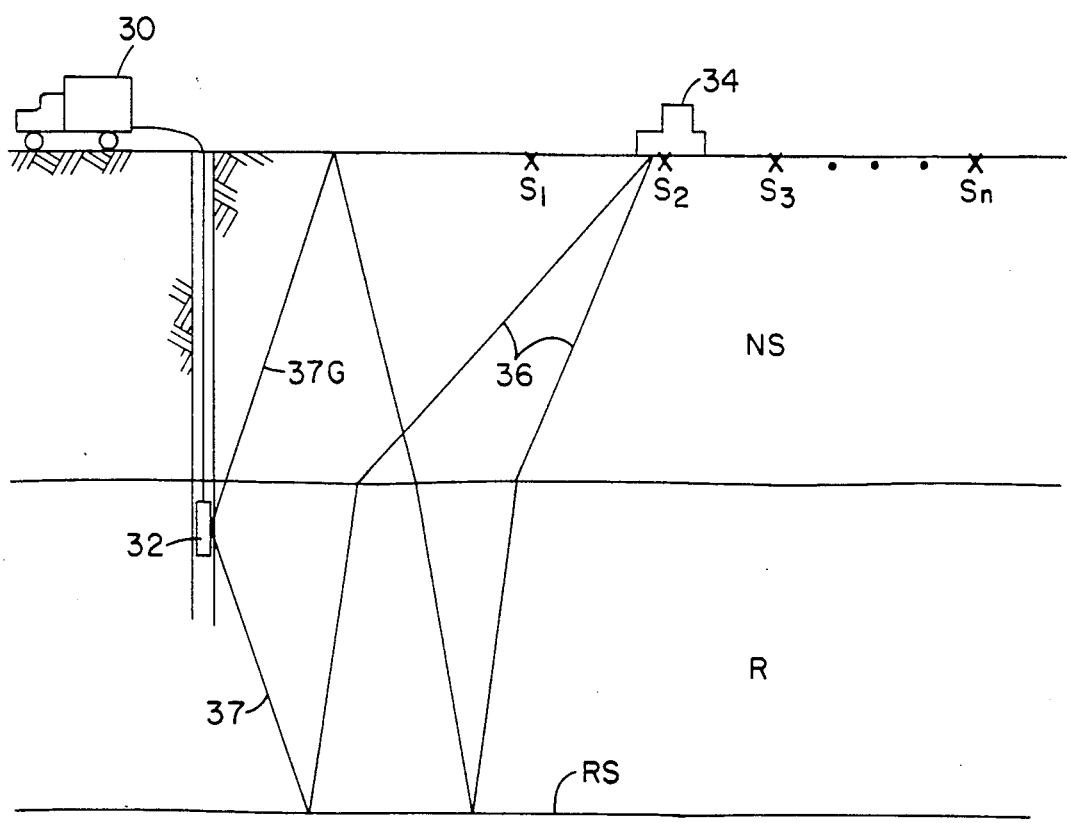
FIG. 4 shows a land seismic survey acquisition geometry in which geophone receivers are buried beneath the surface of the survey area.

As shown in FIG. 4, for land seismic surveying, the survey is accomplished using an acquisition geometry in which a recording truck 30 is coupled to record seismic signals detected by a geophone receiver 32 buried to a depth Z below the earth surface. A seismic source 34 produces a series of seismic shots at shot points $S_1, S_2, S_3 \ldots S_n$.

Each seismic shot produces downgoing seismic signals 36 that propagate through a near surface (LVL) layer NS and a rock layer R, reflecting off a rock strata boundary RS. These reflected seismic signals reach buried geophone receiver 32 in two paths: an upgoing reflection wavefield 37, and a downgoing surface reflection ghost 37G. The seismic signal measured by geophone 32 includes an upgoing reflected wavefield component 37 and a downgoing ghost component 37G.

The depth z of the buried geophone is not critical to the present invention, being a matter of routine design selection. Because the vertical gradient estimation procedure provides a seismic signal processing technique that enables the downgoing ghost wavefield component to be separated and suppressed, the geophone may be buried at a depth below the near surface layer to achieve the advantages described in the related application titled Multicomponent Seismology Using Buried Geophone Receivers.

Although the present invention has been described with respect to a specific, preferred embodiment, various changes and modifications may be suggested to one skilled in the art, and it is intended that, the present invention encompass such changes and modifications as fall within the scope of the appended claims.

What is claimed is:

1. A seismic surveying method comprising:
   determining the source signature of a seismic source;
   determining the impulse response of the medium into which signals from the seismic source are input, by using Green's function for the medium;
   detecting seismic signals at a location below the medium surface from said seismic source;
   estimating the vertical seismic signal gradient for a location below the medium surface using said source signature, said impulse response and said detected seismic signals; and
   separating ghost seismic signals from the detected seismic signals using said estimated vertical seismic signal gradient.

2. The method of claim 1 and further comprising analyzing said seismic signals after said separating step as a seismic survey.

3. The method of claim 1 wherein said medium comprises land.

4. The method of claim 1 wherein said medium comprises water.

5. A seismic surveying method for analyzing data generated by a seismic source producing downgoing seismic source signals that propagate through a survey medium and reflect from sub-surface strata to produce reflected seismic signals including an upgoing reflected seismic signal that propagates back to the surface and reflects downward to produce a downgoing ghost seismic signal and by measurement of the reflected seismic signals at a location below the surface; said method comprising the steps:
   determining the source signature for the seismic source;
   determining Green's function for the survey medium;
   estimating the vertical seismic signal gradient for a sub-surface location using the source signature, the Green's function, and the measured seismic signals; and
   separating the downgoing ghost seismic signal from the upgoing reflected signal using the measured seismic signals, and the estimated vertical seismic signal gradient.

6. The method of claim 5, wherein:
the seismic survey is performed in a marine environment;
the measured seismic signals (upgoing reflected signals and downgoing ghost signals) constitute acoustic pressure signals; and
the seismic signal gradient is estimated in accordance with the relationship:

$$A(\omega) G(r_s,r_g,\omega) = \int_s [P(r',r_s,\omega) \nabla' G(r',r_g, \omega) - G(r',r_g,\omega) \nabla' P(r',r_s,\omega)] \cdot \underline{n}' ds'$$

wherein $A(\omega)$ is the frequency dependent source signature;
wherein $G(r_s,r_g,\omega)$ is the Green's function at said location;
wherein $P(r',r_s,\omega)$ is the measured seismic signal at said location;
and wherein $\nabla' P(r',r_s,\omega)$ is the gradient of said measured seismic signal.

7. The method of claim 6 wherein the source signature for the seismic source is determined by towing said seismic source into water deep enough to be in the far field so that reflections from the water bottom and structure do not significantly corrupt the measured source signature.

8. The method of claim 7 wherein Green's function is represented in a two dimensional (xz) coordinate system by the relationship:

$$G(x',o;x_g,z_g;\omega) = (\tfrac{1}{2}\pi) \int dk' [e^{-ik'(x-x')}e^{ik'_z z}]/2k'_z$$

where $$k'_z{}^2 = \omega^2/c^2 - k'^2$$

and c is the acoustic velocity;
wherein (x',o) represents the location of the measurement of the reflected seismic signals;
and wherein $(x_g,z_g)$ represents the location for which the vertical pressure gradient is estimated.

9. The method of claim 6, wherein the step of estimating the seismic signal gradient is accomplished in accordance with the following steps based on a two dimensional (xz) coordinate system:
performing the Fourier transform:

$$F(k;z;o,-h;\omega) \equiv \int dx\, e^{ikx} F(x_g,z_g;o,-h;\omega)$$

wherein $$F(x_g,z_g,o,-h;\omega) = -A(\omega)G(x_g,z_g;o,-h;\omega) + \int dx' P(x',o;o,-h;\omega) [\partial G(x';o;x_g,z_g;\omega)/\partial z'];$$

multiplying the Fourier transform by the filter factor:

$$2ik_z e^{-k_z z'}$$

performing an inverse Fourier transform to obtain the acoustic pressure gradient:

$$\partial P(x;o;o,-h;\omega)/\partial z'$$

10. The method of claim 9 wherein the source signature for the seismic source is determined by towing said seismic source into water deep enough to be in the far field so that reflections from the water bottom and structure do not significantly corrupt the measured source signature.

11. The method of claim 10 wherein Green's function is represented in a two dimensional (xz) coordinate system by the relationship:

$$G(x',o;x_g,z_g;\omega) = (\tfrac{1}{2}\pi) \int dk' [e^{-ik'(x-x')}e^{ik'_z z}]/2ik'_z$$

where $$k'_z{}^2 = \omega^2/c^2 - k'^2$$

and c is the acoustic velocity;
wherein (x',o) represents the location of the measurement of the reflected seismic signals;
and wherein $(x_g,z_g)$ represents the location for which the vertical pressure gradient is estimated.

12. The method of claim 5 wherein the survey medium comprises land.

13. In a seismic survey in which a seismic source produces downgoing seismic source signals that propagate through the survey medium and reflect from subsurface strata to produce an upgoing reflected seismic signal which propagates back to the surface and reflects downward to produce a downgoing ghost seismic signal; a seismic survey apparatus comprising:
source signature means for determining the source signature for said seismic source;
impulse means for determining the impulse response of the survey medium by using Green's function for the medium;
recording means for measuring the reflected seismic signals resulting from the seismic source signals including the upgoing reflected seismic signal and the downgoing ghost seismic signal at a location below the surface;
signal processing means for estimating the seismic signal gradient at the sub-surface location using the source signature, the impulse response, and the measured seismic signals, and for separating the downgoing ghost signal from the upgoing reflected seismic signal using the measured seismic signals, and the estimated seismic signal gradient.

14. The apparatus of claim 13 wherein said signal processing means further performs the function of attenuating the downgoing ghost seismic signal to improve the signal-to-noise ratio for the seismic survey.

15. The apparatus of claim 14, wherein:
the seismic survey is performed in a marine environment;
the measured seismic signals (upgoing reflected signals and downgoing ghost signals) constitute acoustic pressure signals and
said seismic signal processing means estimates the seismic signal gradient in accordance with the relationship:

$$A(\omega) G(r_s,r_g,\omega) = \int_s [P(r',r_s,\omega) \nabla' G(r',r_g,\omega) - G(r',r_g,\omega) \nabla' P(r',r_s,\omega)] \cdot \underline{n}' ds'$$

wherein $A(\omega)$ is the frequency dependent source signature;
wherein $G(r_s,r_g,\omega)$ is the Green's function at said location;
wherein $P(r',r_s,\omega)$ is the measured seismic signal at said location;
and wherein $\nabla' P(r',r_s,\omega)$ is the gradient of said measured seismic signal.

16. The apparatus of claim 15 wherein said source signature means comprises means for measuring the source signature when said seismic source is in water deep enough to be in the far field so that reflections from the water bottom and structure do not significantly corrupt the measured source signature.

17. The apparatus of claim 16 wherein said impulse means determines the impulse response in accordance with Green's function which is represented in a two dimensional (xz) coordinate system by the relationship:

$$G(x',o;x_g,z_g;\omega)=(\tfrac{1}{2}\pi)\int dk'\,[e^{-ik'(x-x')}e^{ik'_z z}]/2ik'_z$$

where $$k'_z{}^2=\omega^2/c^2-k'^2$$

and c is the acoustic velocity;
wherein (x',o) represents the location of the measurement of the reflected seismic signals;
and wherein $(x_g,z_g)$ represents the location for which the vertical pressure gradient is estimated.

18. The apparatus of claim 15, wherein said seismic signal processing means estimates the seismic signal gradient in accordance with processing functions that, for a two dimensional (xz) coordinate system, comprise:
performing the Fourier transform:

$$i\,F(k);z;o,-h;\omega)\equiv\int dx\,e^{ikx}\,F(x_g,z_g;o,-h;\omega)$$

wherein $$F(x_g,z_g,o,-h;\omega)=-A(\omega)G(x_g,z_g;o,-h;\omega)+\int dx'\,P(x',o;o,-h;\omega)\,[\partial G(x';o;x_g,z_g;\omega)/\partial z'];$$

multiplying the Fourier transform by the filter factor:

$$2ik_z e^{-k_z z}$$

performing an inverse Fourier transform to obtain the acoustic pressure gradient:

$$\partial P(x;o;o,-h;\omega)/\partial z'$$

19. The apparatus of claim 18 wherein said source signature means comprises means for measuring the source signature when said seismic source is in water deep enough to be in the far field so that reflections from the water bottom and structure do not significantly corrupt the measured source signature.

20. The apparatus of claim 19 wherein said impulse means determines the impulse response in accordance with Green's function which is represented in a two dimensional (xz) coordinate system by the relationship:

$$G(x',o;x_g,z_g;\omega)=(\tfrac{1}{2}\pi)\int dk'\,[e^{-ik'(x-x')}e^{ik'_z z}]/2ik'z$$

where $$k'_z{}^2=\omega^2/c^2-k'^2$$

and c is the acoustic velocity
wherein (x',o) represents the location of the measurement of the reflected seismic signals;
and wherein $(x_g,z_g)$ represents the location for which the vertical pressure gradient is estimated.

21. A method of de-ghosting seismic data detected below the surface of a medium during seismic prospecting, using the signature of the seismic source, comprising:
determining the source signature of a seismic source;
determining the impulse response of the medium for a location below the medium surface by using Green's function for the medium;
estimating the seismic signal gradient in a direction perpendicular to the medium surface for a location below the medium surface, using said signature, said impulse response and said detected seismic data; and
separating ghost data from said detected seismic data using said estimated perpendicular seismic signal gradient.

22. The method of claim 21, wherein said estimating step comprises:
calculating a function of frequency from said signature, said impulse response for said location below the medium surface, said detected data, and the gradient of Green's function at the detecting location;
performing the Fourier transform of said function of frequency;
filtering said Fourier transform; and
performing the inverse Fourier transform of the result of said filtering.

23. The method of claim 21, wherein said seismic data is detected at, and the impulse response is determined for, the same location.

24. The method of claim 21, wherein said medium comprises water.

25. The method of claim 21, wherein said medium comprises land.

26. The method of claim 21, wherein the ghosting results from the detection of reflection of the source signal from the surface of the medium.

27. The method of claim 26, wherein the ghosting also results from the detection of reflection of the source signal from the surface of the medium, wherein the reflection previously reflected from a sub-surface stratum.

28. The method of claim 21, wherein the ghosting results from the detection of reflection of the source signal from the surface of the medium, wherein the reflection previously reflected from a sub-surface stratum.

29. The method of claim 21, wherein said step of determining the source signature comprises:
generating seismic energy into said medium with said seismic source; and
measuring said generated seismic energy to determine said source signature.

30. The method of claim 29, wherein said step of measuring said generated seismic energy is performed at a location in said medium away from the location of said seismic source.

31. The method of claim 30, wherein said step of determining the source signature further comprises:
correcting said measured seismic energy for the effects of the medium thereupon to determine said source signature.

32. The method of claim 29, wherein the medium is land.

33. The method of claim 29, wherein the medium is water.

* * * * *

UNITED STATES PATENT AND TRADEMARK OFFICE
CERTIFICATE OF CORRECTION

PATENT NO. : 5,051,961
DATED : September 24, 1991
INVENTOR(S) : Dennis Corrigan; Arthur B. Weglein; David D. Thompson It is certified that error appears in the above-identified patent and that said Letters Patent is hereby corrected as shown below:

Column 6, lines 30 through 34, equation [2] should read as follows:

$$A(\omega)G(0,-h;x_g,z_g;\omega) = \int dx' \{P(x',0;0,-h;\omega)[\partial G(x',0;x_g,z_g;\omega)/\partial z'] - G(x',0;x_g,z_g;\omega)[\partial P(x',0;0,-h;\omega)/\partial z']\}$$

[2]

Column 6, lines 39 through 42, equation [3] should read as follows:

$$\int dx' G(x',0;x_g,z_g;\omega)[\partial P(x',0;0,-h;\omega)/\partial z'] = -A(\omega)G(0,h;x_g,z_g;\omega) + \int dx' P(x',0;0,-h;\omega)[\partial G(x',0;x_g,z_g;\omega)/\partial z']$$

[3]

Column 6, line 52, equation [4] should read as follows:

$$G(x',0;x,z;\omega) = (\frac{1}{2}\pi)\int dk' [e^{-ik'(x-x')}e^{ik'_z z}]/2ik'_z$$

[4]

UNITED STATES PATENT AND TRADEMARK OFFICE
CERTIFICATE OF CORRECTION

Page 2 of 6

PATENT NO. : 5,051,961
DATED : September 24, 1991
INVENTOR(S) : Dennis Corrigan; Arthur B. Weglein; David D. Thompson It is certified that error appears in the above-identified patent and that said Letters Patent is hereby corrected as shown below:

Column 6, lines 65 through 68, equation [6] should read as follows:

$$\partial P(x',0;0,-h;\omega)/\partial z' = \int dk$$
$$2ik_z e^{-ikx'-ik_z z'} F(k;z';0,-h;\omega)$$

[6]

Column 7, line 5,
"$\partial P \partial z'$", should read $--\partial P/\partial z'--$.

Column 7, lines 10 and 11, the equation should read as follows:

$$F(x_g, z_g; 0, -h; \omega) = -A(\omega) G(0, h; x_g, z_g; \omega) + \int dx'$$
$$P(x', 0; 0, -h; \omega) [\partial G(x', 0; x_g, z_g; \omega)/\partial z']$$

Column 7, line 20, the expression should read as follows:

$$2ik_z e^{-ik_z z}$$

UNITED STATES PATENT AND TRADEMARK OFFICE
CERTIFICATE OF CORRECTION

PATENT NO. : 5,051,961

DATED : September 24, 1991

INVENTOR(S) : Dennis Corrigan; Arthur B. Weglein; David D. Thompson

It is certified that error appears in the above-identified patent and that said Letters Patent is hereby corrected as shown below:

In claim 6, the equation should read:

$$A(\omega) G(\underline{r}_s, \underline{r}_g, \omega) = \int_S [P(\underline{r}', \underline{r}_s, \omega) \nabla G(\underline{r}', \underline{r}_g, \omega) - G(\underline{r}', \underline{r}_g, \omega) \nabla P(\underline{r}', \underline{r}_s, \omega)] \cdot \underline{n}' ds'$$

In claim 8, the equation should read:

$$G(x', 0; x, z; \omega) = (\frac{1}{2}\pi) \int dk' [e^{-ik'(x-x')} e^{ik'_z z}] / 2ik'_z$$

In claim 8, on column 9, line 41,
"$(x_g, z_g)$" should read --$(x,z)$--.

In claim 9, the first equation should read:

$$F(k; z; 0, -h; \omega) \equiv \int dx e^{ikx} F(x, z; 0, -h; \omega)$$

In claim 9, the second equation should read:

$$F(x_g, z_g; 0, -h; \omega) = -A(\omega) G(0, h; x_g, z_g; \omega) + \int dx' P(x', 0; 0, -h; \omega) [\partial G(x', 0; x_g, z_g; \omega) / \partial z'] ;$$

UNITED STATES PATENT AND TRADEMARK OFFICE
CERTIFICATE OF CORRECTION

PATENT NO. : 5,051,961
DATED : September 24, 1991
INVENTOR(S) : Dennis Corrigan; Arthur B. Weglein; David D. Thompson It is certified that error appears in the above-identified patent and that said Letters Patent is hereby corrected as shown below:

In claim 9, column 9, line 58 should read:

$$2ik_z e^{-ik_z z}$$

In claim 11, the equation should read:

$$G(x',0;x,z;\omega) = (\frac{1}{2}\pi) \int dk' [e^{-ik'(x-x')} e^{ik'_z z}]/2ik'_z$$

In claim 11, on column 10, line 16,
"$(x_g, z_g)$" should read --$(x,z)$--.

In claim 15, the equation should read:

$$A(\omega)G(\underline{r}_s, \underline{r}_g, \omega) = \int_S [P(\underline{r}', \underline{r}_s, \omega) \nabla G(\underline{r}', \underline{r}_g, \omega)$$
$$- G(\underline{r}', \underline{r}_g, \omega) \nabla P(\underline{r}', \underline{r}_s, \omega)] \cdot \underline{n}' ds'$$

UNITED STATES PATENT AND TRADEMARK OFFICE
CERTIFICATE OF CORRECTION

PATENT NO. : 5,051,961
DATED : September 24, 1991
INVENTOR(S) : Dennis Corrigan; Arthur B. Weglein; David D. Thompson It is certified that error appears in the above-identified patent and that said Letters Patent is hereby corrected as shown below:

In claim 17, the equation should read:

$$G(x',0;x,z;\omega) = (\frac{1}{2}\pi) \int dk' [e^{-ik'(x-x')} e^{ik'_z z}] / 2ik'_z$$

In claim 17, on column 11, line 21,
"$(x_g, z_g)$" should read --$(x,z)$--.

In claim 18, the first equation should read:

$$F(k;z;0,-h;\omega) \equiv \int dx\, e^{ikx} F(x,z;0,-h;\omega)$$

In claim 18, the second equation should read:

$$F(x_g, z_g; 0, -h; \omega) = -A(\omega) G(0, h; x_g, z_g; \omega) + \int dx'$$
$$P(x', 0; 0, -h; \omega) [\partial G(x', 0; x_g, z_g; \omega) / \partial z'];$$

In claim 18, column 11, line 37 should read:

$$2ik_z e^{-ik_z z}$$

UNITED STATES PATENT AND TRADEMARK OFFICE
CERTIFICATE OF CORRECTION

PATENT NO. : 5,051,961

DATED : September 24, 1991

INVENTOR(S) : Dennis Corrigan; Arthur B. Weglein; David D. Thompson

It is certified that error appears in the above-identified patent and that said Letters Patent is hereby corrected as shown below:

In claim 20, the equation should read:

$$G(x',0;x,z;\omega) = (\frac{1}{2}\pi) \int dk' [e^{-ik'(x-x')} e^{ik'_z z}] / 2ik'_z$$

In claim 20, on column 11, line 63,
"$(x_g, z_g)$" should read --$(x,z)$--.

Signed and Sealed this

Eleventh Day of October, 1994

Attest:

BRUCE LEHMAN

Attesting Officer

Commissioner of Patents and Trademarks